April 16, 1968  G. K. NEWELL  3,378,227
VALVE DEVICE

Filed March 30, 1965  4 Sheets-Sheet 1

INVENTOR.
GEORGE K. NEWELL
BY
*A. A. Steinmiller*
ATTORNEY

April 16, 1968  G. K. NEWELL  3,378,227
VALVE DEVICE

Filed March 30, 1965  4 Sheets-Sheet 2

INVENTOR.
GEORGE K. NEWELL
BY
A. A. Steinmiller
ATTORNEY

April 16, 1968  G. K. NEWELL  3,378,227
VALVE DEVICE

Filed March 30, 1965  4 Sheets-Sheet 4

INVENTOR.
GEORGE K. NEWELL
BY
*A. A. Steinmiller*
ATTORNEY

Patented Apr. 16, 1968

3,378,227
VALVE DEVICE
George K. Newell, Penn Township, Westmoreland County, Pa., assignor to Westinghouse Air Brake Company, Wilmerding, Pa., a corporation of Pennsylvania
Filed Mar. 30, 1965, Ser. No. 443,846
4 Claims. (Cl. 251—304)

ABSTRACT OF THE DISCLOSURE

A valve device comprising a housing with a disc valve therein having a peripheral O-ring sealing means and an operating stem fitted to the disc valve at an angle of 45° or less so that the disc valve will project a minimum frontal area in resistance to flow within the fluid path when the disc valve is rotated to its open position.

---

This invention relates generally to valve devices of the type commonly referred to as angle or cut-out cocks, and, more particularly, to such valve devices in which the valve member comprises a disc having an O-ring seal and an operating stem joined centrally to the disc at an angle of 45° or less, and is adapted to provide a maximum flow passage opening through the valve device with full opening movement of the valve member.

According to the existing well-known construction of angle and cut-out cocks, the valve member is customarily made as a tapered cylindrical valve member seated on a correspondingly tapered seat in the cock body, to which it is lapped or ground, and has an aperture therethrough which is aligned with or transverse to the flow passage through the cock as the valve member is turned to control flow of fluid through the cock device.

This type of angle or cut-out cock device is reliable and has a satisfactory service life. However, it requires skilled workmen to manufacture, particularly to effect the necessary lapping or grinding in of the valve member to the valve seat. In consequence, the existing type of angle or cut-out cock device is a relatively high cost item and various proposals have been made, for a number of years, in an attempt to provide a relatively low cost valve device which can be serviced by relatively unskilled personnel in the field and which has a longer service life than existing angle and cut-out cock devices.

These proposals have consisted, in many cases, of attempts to modify the existing valve member and valve body to provide rubber O-ring seals in the valve member or valve body. Thus far, no satisfactory design has been arrived at which is more satisfactory so far as service life and cost of production are concerned. Moreover, so far as known, no modification of existing angle cocks or cut-out cocks has been proposed which enlarges the area of the flow passage through the valve.

It is accordingly the object of the present invention to provide a new design of angle or cut-out cock devices, utilizable, for example, in the brake pipe system of railroad cars and trains, which is relatively simple in construction and low in cost, which enables servicing by relatively unskilled personnel in the field without detachment from the piping system, and which at the same time provides a greatly enlarged flow area through the cock device, thereby providing minimum obstruction to flow of air through the brake pipe in its fully open position.

According to the invention, there is provided an angle or cut-out cock having a sectionalized cock body in which a disc valve element is formed on or secured to a valve stem at an angle of 45° or less to the axis of the stem. The disc valve element has an O-ring seal secured on the periphery thereof which is constantly in contact at two diametrically opposite points with a bushing in the cock body coaxial to the flow passage therein. The bushing is secured in one section of the cock body and the valve stem is sealingly mounted for rotation in a correspondingly oriented bore in the other section of the cock body. Separation of the sections of the cock body enables easy removal of the disc valve element, the stem, and the bushing for replacement or repair. Several embodiments are disclosed, in one of which the disc valve element is supported entirely by a stem rotatively mounted in the cock body at one side of the valve element, and in another of which the disc valve is supported by portions of the valve stem on opposite sides thereof. In one embodiment in which the disc valve is approximately 30° at an angle to the stem, the swing of the operating handle attached to the outer end of the valve stem is limited to 90°. In the embodiment in which the disc valve element is at an angle of 45° to the valve stem, the swing of the handle may attain 180°. A feature of the invention resides in the provision of an O-ring assembly for the valve disc which insures against extrusion of the O-ring from the valve disc. The salient advantages of the invention comprise (1) ease of assembly and disassembly, (2) repair or replacement of the valve element in the field by unskilled personnel, (3) simplicity, (4) low cost of manufacture, and last and most important (5) minimum obstruction of flow passage in open position of valve element, thus attaining a flow area which is substantially larger than that of existing angle or cut-out cocks.

Figure 1:
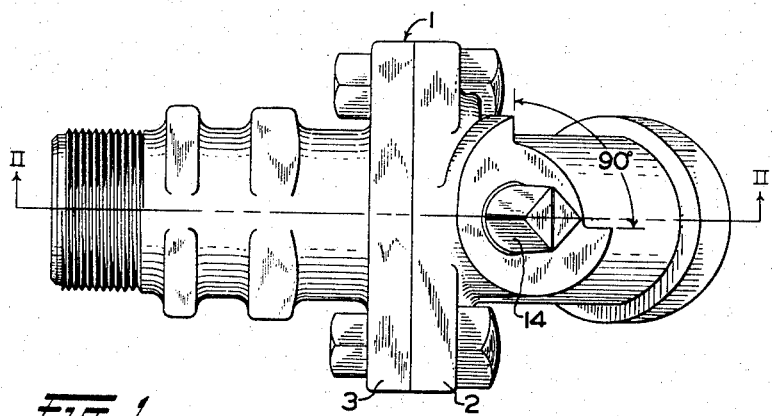
FIG. 1 is a plan view of one embodiment of an angle cock, with the handle removed for clarity, in which the handle swing from full open to full closed position is 90°.

Referring now to the drawings, the valve device shown in FIGS. 1 to 5B comprises a sectionalized cock body 1 having two separable sections 2 and 3, secured together in sealed relation as by bolts, and a conventional O-ring seal between the sections, the sections having communicating bores providing a flow passage through the valve device. Section 3 includes an externally threaded extension 5 having a main flow passage 6 therein adapted for connection to the end of the brake pipe on a railroad car. Section 2 has an internally threaded extension 7, adapted for connection to a hose and coupling assembly of a railroad car, which has a passage 8 therein that communicates with passage 6 of section 3.

Section 2 has a bore 10 which intersects main flow passage 8 at an angle of approximately 30°. A bushing 11 is press-fitted in the bore 10 and receives therein an assembly 9 which is inserted from the inside of valve section 2. Assembly 9 comprises a stem element having one portion 12 slidably fitted inside a sleeve portion 13 and locked for rotation therewith by gudgeon 17. Assembly 9 slides into bushing 11 until an annular shoulder on sleeve portion 13 contacts the inner end of the bushing 11. An O-ring grommet set into an annular groove in the outer surface of sleeve 13 seals on the bushing 11. The sleeve portion 13 of assembly 9 extends out of bore 10 and has a polygonal boss 14 on its outer end onto which handle 15 is attached as by a conventional transverse pin. Formed on or attached to the inner end of stem portion 12 is a valve disc member 18. Valve disc member 18 has a central circular boss (FIG. 5) on the face opposite to that to which stem portion 12 is joined and a washer 19 fits over said circular boss and is held in place by snap ring 21 which engages in an annular groove on the outer surface of the central boss. The face of the disc member 18 and the inside face of washer 19 are correspondingly stepped on their respectively opposing faces forming an annular supporting shoulder 24. Supported on shoulder 24 within the annular groove formed between the disc member 18 and washer 19 is an O-ring assembly.

Figure 5:
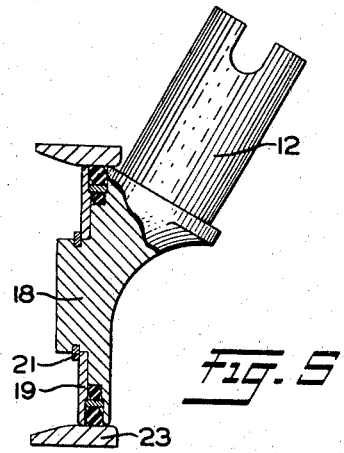
FIG. 5 is an enlarged, fragmental cross-sectional view of the valve member and its stem, showing details of construction thereof.
Figure 5A:
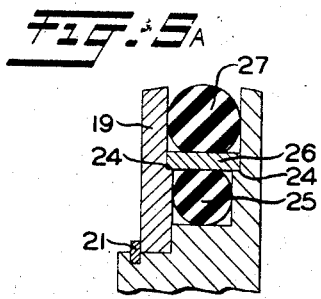
FIG. 5A is a fragmental enlarged sectional view of FIG. 5, showing the double O-ring grommet without the bushing.
Figure 5B:
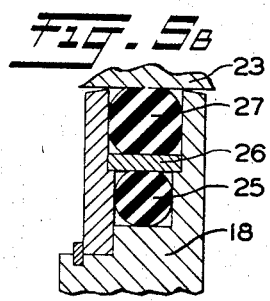
FIG. 5B is a fragmental enlarged partial sectional view of FIG. 5, showing the double O-ring grommet within the bushing.

The O-ring assembly comprises an inner O-ring 25, a metal retaining ring 26 surrounding and bonded to the inner O-ring, and an outer O-ring 27 which is bonded to the outer surface of retaining ring 26. This assembly will be hereafter referred to as a double O-ring grommet. It will be noted, as in FIG. 5, that the inside O-ring has been slightly flattened on each side abutting the respective disc and washer faces. This is caused by the pressure exerted by washer 19. It will also be noted in compressing the inner O-ring slightly the inner periphery thereof is slightly flattened against the bottom of the groove. This can be better seen in FIG. 5A where the O-ring assembly is shown in greater detail. The disc member 18 extends into section 2, and the outer O-ring 27 of the double O-ring grommet is seated inside bushing 23. FIG. 5B shows the O-ring assembly between the disc member and washer and inside the bushing 23. FIG. 5A shows the double O-ring grommet between the disc member and washer but free of the compressive force of bushing 23 which results when the disc and grommet assembly are in a transverse position that closes the passageway to fluid flow. The smaller O-ring, it will be noted, is under the same compressive force in FIGS. 5A and 5B because the smaller O-ring is not subject to compressive force of bushing 23 as shown in FIG. 5B, because metal retaining ring 26 which rests on shoulder 24 restricts any compression on the inner O-ring. The outer O-ring is slightly compressed when washer 19 is inserted and member 21 is snapped into place, as shown in FIG. 5A, and when it is completely surrounded by the bushing, it is compressed and distorted, thus making a seal, an airtight seal, in said flow passage. The double O-ring grommet serves two purposes. First, it seals the passage at the outer O-ring and bushing, and it also seals the disc per se from leaking at snap ring 21. This latter leak is prevented by the inner O-ring. It should be noted that there are two avenues of escape for air, one at the bushing and larger O-ring contact point, the other at the seam which is created by the washer element 19. Since one O-ring will only successfully seal at one corner, here two O-rings in combination are used to successfully seal two corners of possible fluid leakage in the passage of the cock.

Figure 2:
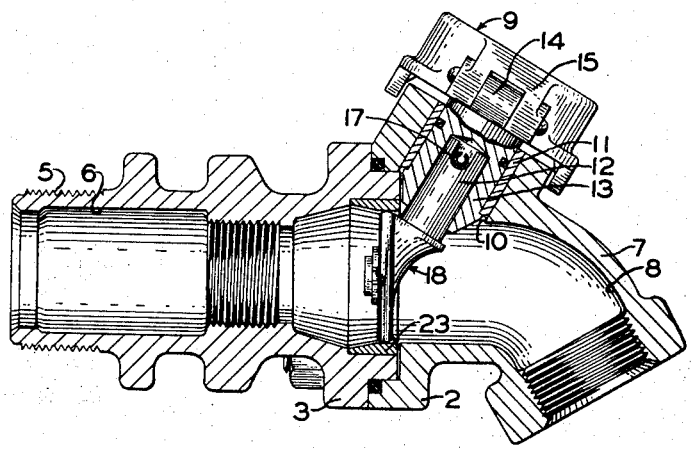
FIG. 2 is a longitudinal cross-sectional view, taken on line II—II of FIG. 1, showing the position of the member with the valve stem in fully closed position.
Figure 3:
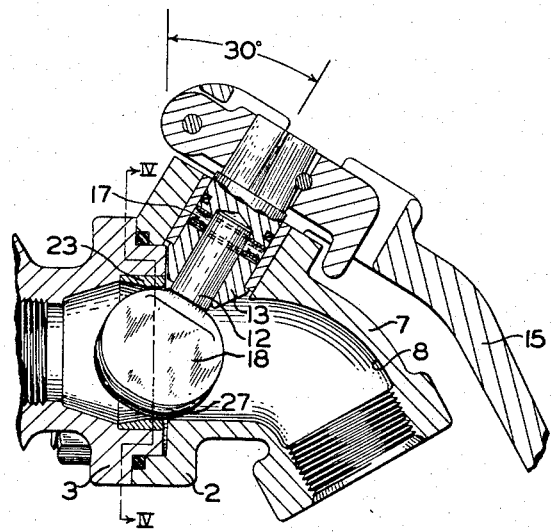
FIG. 3 is a fragmental longitudinal cross-sectional view, corresponding to FIG. 2, showing the valve member in full open position.
Figure 4:
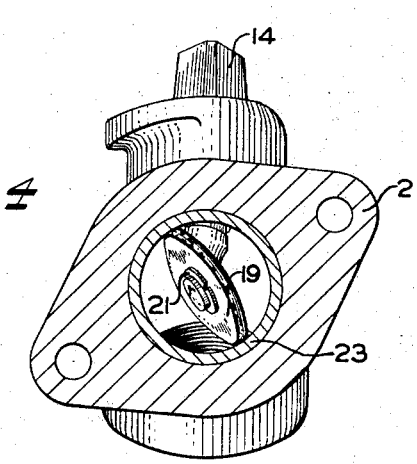
FIG. 4 is a sectional view, taken along the line IV—IV of FIG. 3, showing the valve member of FIG. 2 in its full open position, as viewed from one end of the valve body.

The operation of the valve is as follows. With the disc valve member in full open position (FIG. 3), handle 15 is parallel to the fluid flow and the cock passage per se. In this position, as can be seen in FIG. 4, the double O-ring grommet contacts the bushing at only two diametrically opposite points. When handle 15 is turned 90° to its valve closing position, in which it is shown in FIG. 2, the disc valve member rotates to full closed position and the double O-ring grommet is completely surrounded by and seals on bushing 23.

Figure 6:
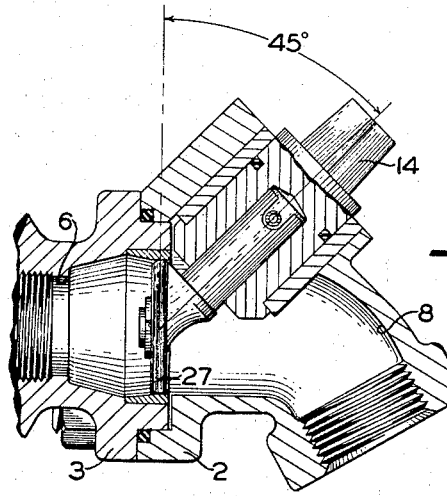
FIG. 6 is a cross-sectional view of another embodiment of an angle cock, with the valve handle removed, showing a valve member in which the angle between the valve disc and valve stem is 45°.
Figure 7:
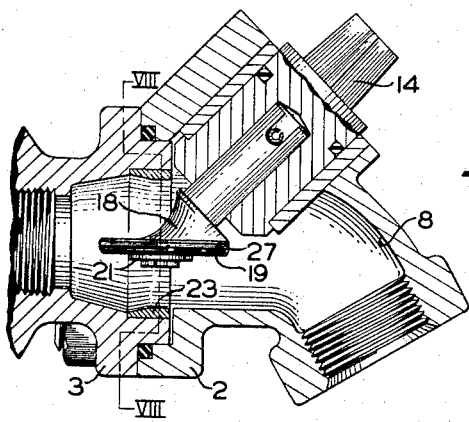
FIG. 7 is a cross-sectional view of the angle cock of FIG. 6, showing the position of the valve member when rotated 180° out of closed position to its fully open position.
Figure 8:
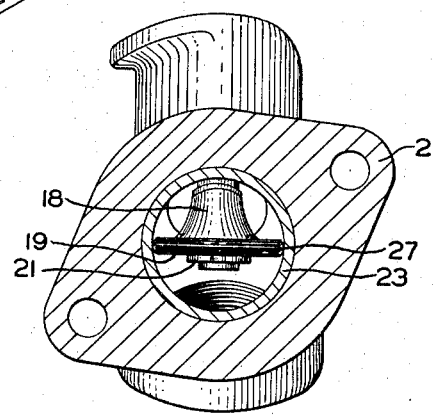
FIG. 8 is a sectional view, taken along line VIII—VIII of FIG. 7, showing the valve member in its fully open position as it appears from the end of the angle cock.

A modification of the valve device is shown in FIGS. 6 through 8. This valve device is modified so that it will turn from full open (FIGS. 7 and 8) to full close (FIG. 6) in a 180° swing of the handle, compared to the full open position of FIGS. 3 and 4 and the full close position of FIGS. 2 and 5 which show a 90° handle swing. This differential in handle swing is accomplished by increasing the angle between the valve disc and stem of about 30° in FIG. 3 to 45° in FIG. 6.

Figure 9:
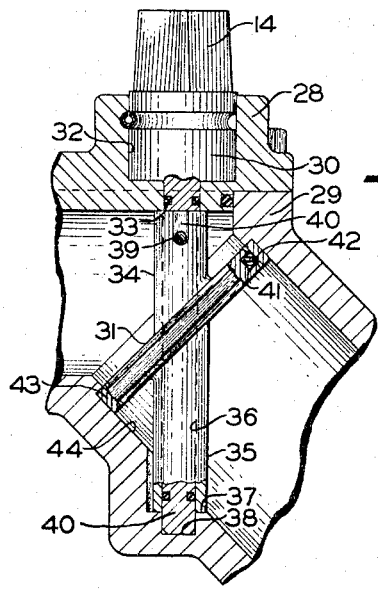
FIG. 9 is a fragmental sectional view of another embodiment of an angle cock, in which the valve disc has a valve stem supported in the cock body on opposite sides of the valve disc.

In FIG. 9 a modified form of angle cock is shown wherein the cock body comprises two separable sections 28 and 29, secured in sealed relation as by bolts. A valve assembly is provided comprising an operating stem 30 and a disc valve element 31. The stem includes a portion of relatively large diameter rotatably mounted in a bore 32 in section 28, the outer end of which forms the handle receiving boss 14. The stem further includes a portion of reduced diameter 40, preferably integrally formed with the larger diameter portion and sealed, as by an O-ring grommet 33, with the corresponding bore in body section 28. The end of the stem portion of reduced diameter nests in a circular recess 38 in body section 29 for rotative support thereby. The stem is illustrated as being in a vertical position.

The disc valve element comprises an integrally formed disc body and aligned trunnions 34 and 35 extending at an angle, illustratively shown as 45°, from opposite faces of the disc body. A bore 36, which extends longitudinally through both trunnions and the disc body, conforms in diameter to that of the valve stem portion of reduced diameter. The disc valve element is fitted slidably over the valve stem portion and, with the body sections secured together, is retained in position by the trunnions, one of which contacts the inner face of body section 28, and the other of which contacts a circular shoulder 37 on the body section 29 surrounding recess 38. A transverse pin 39 extends through valve stem 40 and cooperating diametrical slots in the end of the upper trunnion 34 to lock the stem and valve element for rotation together. A suitable O-ring grommet in an annular groove in the reduced diameter portion of stem 30 provides a seal with the bore 36 in the lower trunnion 35.

The disc body has an annular groove 41 in the periphery thereof in which case a single O-ring grommet 42 is mounted simply by stretching it and allowing it to contract into the groove. A suitable bushing 43 is preferably press-fitted into a bore 44 forming an outlet flow passage for the cock for sealing contact therewith by the O-ring grommet 42 on the disc valve element.

The disc valve element 31 is shown in its closed position. Rotation of the stem 30, through a suitable angle, such as 90°, from that in which it is shown, rotates the disc valve element 31 to its open position, in which diametrically opposite points on the O-ring grommet 42 remain in contact with bushing 43, while opening a passage for flow of fluid through the cock around both sides of disc valve element 31.

Figure 10:
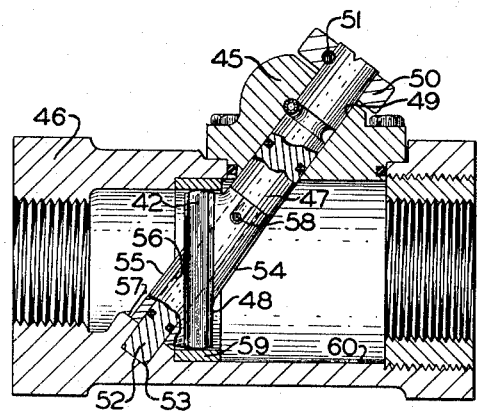
FIG. 10 is a cross-sectional view of a valve device, commonly called a cut-out cock, showing the valve member in its closed position.

In FIG. 10 another modification is shown, which is a cut-out cock comprising two separable body sections 45 and 46 secured in sealed relation, as by bolts or screws. The cut-out cock also comprises a valve assembly which includes a stem 47 and a disc valve element 48. The stem is comprised of a large diameter portion rotatably mounted in a bore 49 in body section 45 and sealed therein by a conventional O-ring. The stem projects out of body section 45 and receives a handle 50 which is locked thereto as by a pin 51. The stem also includes a portion 52 of reduced diameter, which can be integral with the remainder of the stem, and nests in a circular recess 53 in body section 46 for rotative support thereby.

Disc valve element 48 comprises an integrally formed disc body and aligned trunnions 54 and 55 extending at an angle from opposite faces of the disc body. A bore 56, which extends longitudinally through both trunnions and the disc body, conforms in diameter to that of the valve stem portion of reduced diameter. It will be seen, therefore, that the disc valve element is slidably fitted over the reduced diameter portion of the valve stem and, with the body sections assembled, is retained in position by the trunnions, one of which abuts a shoulder formed between the large diameter portion and the reduced diameter portion of the stem, and the other of which seats against a circular shoulder 57 on the body section 46 surrounding recess 53. A transverse pin 58, extending through valve stem 52 and corresponding diametrical slots in the end of the upper trunnion 54, serves to lock the stem and disc valve element for rotation together.

As in the embodiment of FIG. 9, the disc body has an annular groove in the periphery thereof in which a single O-ring grommet 42 is mounted. A suitable bushing 59 is press-fitted into a bore 60 forming a flow passage for the cock on which O-ring grommet 42 seals in the closed position of the valve.

Figure 11:
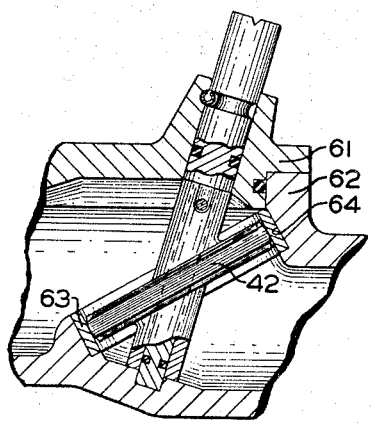
FIG. 11 is a fragmental sectional view of another embodiment of an angle cock, in which the valve disc, in its closed position, and the valve stem are both at an angle to the vertical.

Another modification of an angle cock is shown in FIG. 11 and comprises two separable sections 61 and 62 held together as by bolts and a valve assembly, comprising a stem and a disc valve element, of the type described in relation to the cut-out cock shown in FIG. 10. The disc valve element seats in a suitable bushing 63 which is press-fitted in bore 64 in body section 62 which forms a part of the flow passage through the cock.

While the angle between the valve stem and the disc valve element in each of FIGS. 10 and 11 is shown as approximately 45°, it will be apparent that this angular relation may be less than 45°. Rotation of the valve stem and corresponding rotation of the disc valve element in each of these embodiments through an angle of approximately 90° from the closed position in which they are shown in the drawings results in the rotation of the valve element to its open position.

From the foregoing, it can be readily seen that the new valve device gives a better flow rate for valve cross-section area and combines easier repair of the valve device components.

Although specific embodiments of the invention have been shown and described, it is with full awareness that other modifications thereof are possible.

Having now described the invention, what I claim as new and desire to secure by Letters Patent is:

1. In a cock:
   (a) a valve means comprising a disc means and a stem means connected thereto,
   (b) said stem means having a first end and another end,
   (c) said disc means comprising a first element and a second element,
   (d) said first element having one side and another side,
   (e) said second element having an inside and an outside, and an aperture through the center of said second element,
   (f) said first end integral with said first element and attached thereto on said one side,
   (g) a circular boss integral with and projecting from the center of said another side of the first element,
   (h) said another side having a step contour forming a first shoulder concentrically surrounding said circular boss, and a second shoulder concentrically surrounding said circular boss and in radially outwardly spaced relation to said first shoulder, said inside having a third shoulder concentrically surrounding the said aperture of said second element, and when the said second element's aperture is fitted over said circular boss and said inside is placed adjacent to said another side, the said second and third shoulders will be coaxially aligned,
   (i) a metal ring seated on said coaxially aligned shoulders, a first O-ring fitted to the interior of said metal ring, and a second O-ring fitted to the exterior of said metal ring, whereby a seal is created between the said O-rings, said another side and said inside.

2. The cock means of claim 1, having a bushing wherein said first O-ring and said second O-ring are bonded to said metal ring and said second O-ring forms the periphery of said disc means and is tightly compressed when said second O-ring is completely within said bushing thus forming an airtight seal between the said bushing and the said valve means.

3. In a cock:
   (a) a valve means comprising a disc valve element and an operating stem therefor,
   (b) said disc valve element comprising two separable parts adapted when joined to form a peripheral annular groove having a stepped contour providing an annular shoulder,
   (c) an O-ring seal disposed in said peripheral annular groove, said O-ring seal comprising:
      (i) a metal ring, the internal diameter of which conforms to the diameter of said shoulder so as to support said ring thereon,
      (ii) a first O-ring of rubber material bonded to the inner surface of said metal ring and sealingly contacting the faces of said separable parts of the disc element forming the sides of the peripheral annular groove,
      (iii) a second O-ring of rubber material bonded to the other surface of said metal ring and sealingly contacting the faces of the separable parts of the disc valve element forming the side of said peripheral annular groove, the said operating stem being joined at one end to one of the pairs of said disc valve elements centrally of the O-ring seal and effective on axial rotation to turn said disc valve element.

4. In a cock, valve means as claimed in claim 3, further characterized in that said operating stem is joined to the said one of the parts of the disc valve element centrally of the O-ring seal and at an angle of less than 45° with respect to the plane of the valve element whereby upon rotation of the stem said disc valve element is correspondingly rotated.

References Cited

UNITED STATES PATENTS

| 2,907,548 | 10/1959 | Maas et al. | 251—308 |
| 3,159,376 | 12/1964 | Ray | 251—175 X |
| 3,268,202 | 8/1966 | Murray et al. | 251—86 |

FOREIGN PATENTS 221,683  11/1957  Australia.

M. CARY NELSON, *Primary Examiner.*

WALTER JOHNSON, R. C. MILLER,
*Assistant Examiners.*